US009405146B2

(12) United States Patent
Zhang

(10) Patent No.: US 9,405,146 B2
(45) Date of Patent: Aug. 2, 2016

(54) QUANTUM DOT COLOR FILTER, LIQUID CRYSTAL PANEL AND DISPLAY DEVICE

(71) Applicant: BOE TECHNOLOGY GROUP CO., LTD., Beijing (CN)

(72) Inventor: Lilei Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 109 days.

(21) Appl. No.: 14/072,247

(22) Filed: Nov. 5, 2013

(65) Prior Publication Data

US 2014/0132890 A1 May 15, 2014

(30) Foreign Application Priority Data

Nov. 9, 2012 (CN) .......................... 2012 1 0448399

(51) Int. Cl.
*G02F 1/1335* (2006.01)
(52) U.S. Cl.
CPC .... *G02F 1/133514* (2013.01); *G02F 1/133617* (2013.01); *G02F 1/133621* (2013.01)
(58) Field of Classification Search
CPC .................... G02F 1/133617; G02F 1/133514; G02F 1/133621
See application file for complete search history.

(56) References Cited

U.S. PATENT DOCUMENTS

| 2008/0158480 A1* | 7/2008 | Ii et al. ............................. 349/71 |
| 2008/0203895 A1* | 8/2008 | Miller et al. .................. 313/498 |
| 2008/0203899 A1* | 8/2008 | Miller et al. .................. 313/499 |
| 2012/0274882 A1* | 11/2012 | Jung ............................... 349/96 |
| 2012/0326180 A1* | 12/2012 | Ohe et al. ........................ 257/88 |
| 2013/0242228 A1* | 9/2013 | Park et al. ...................... 349/61 |

FOREIGN PATENT DOCUMENTS

CN 102751275 A 10/2012

OTHER PUBLICATIONS

First Office Action issued by the Chinese Patent Office for Chinese Patent Application No. 201210448399.0 dated Aug. 8, 2014. 4pgs.
English translation of First Office Action issued by the Chinese Patent Office for Chinese Patent Application No. 201210448399.0 dated Aug. 8, 2014. 3pgs.
Second Office Action issued by the State Intellectual Property Office for P.R.C., in Chinese Patent Application No. 201210448399.0 dated Dec. 23, 2014. 5 pages.
English translation of Second Office Action issued by the State Intellectual Property Office for P.R.C., in Chinese Patent Application No. 201210448399.0 dated Dec. 23, 2014. 4 pages.
Third Office Action issued by the State Intellectual Property Office for P.R.C., in Chinese Patent Application No. 201210448399.0 dated Apr. 13, 2015. 5 pages.

(Continued)

*Primary Examiner* — Michael Caley
*Assistant Examiner* — Jia Pan

(57) ABSTRACT

A quantum dot color filter is used for a liquid crystal panel comprising a plurality of pixels. Each pixel has a plurality of sub-pixels. Each sub-pixel corresponds to one color. The color filter includes subregions disposed in one to one correspondence with the sub-pixels. At least one subregion is formed of a quantum dot material and the quantum dot material generates light of the same color as a corresponding sub-pixel after excitation.

1 Claim, 1 Drawing Sheet

(56) References Cited

OTHER PUBLICATIONS

English translation of Third Office Action issued by the State Intellectual Property Office for P.R.C., in Chinese Patent Application No. 201210448399.0 dated Apr. 13, 2015. 4 pages.

Fourth Office Action (in Chinese language) issued by the State Intellectual Property Office for People's Republic of China, in Chinese Patent Application No. 201210448399.0 dated Jul. 24, 2015; 4 pages.
English translation of Fourth Office Action issued by the State Intellectual Property Office for People's Republic of China, in Chinese Patent Application No. 201210448399.0 dated Jul. 24, 2015; 3 pages.

* cited by examiner

QUANTUM DOT COLOR FILTER, LIQUID CRYSTAL PANEL AND DISPLAY DEVICE

CROSS-REFERENCE TO RELATED APPLICATIONS

This application claims priority from Chinese National Application No. 201210448399.0 filed on Nov. 9, 2012, the contents of which are incorporated herein by reference.

TECHNICAL FIELD

Embodiments of the present disclosure relate to a quantum dot color filter, a liquid crystal panel and a display device.

BACKGROUND

A quantum dot is a semiconductor nanometer structure that confines conduction band electrons, valence band holes and excitons in three spatial directions. This confinement can be attributed to the factors: electrostatic potential (generated by external electrodes, doping, stress or impurity), interface between two different semiconductor materials (for example in self-assembling quantum dots), semiconductor surface (such as semiconductor nanocrystal) or combination of the above. Quantum dots have discrete quantized energy spectrum, and the corresponding wave function is located in the quantum dot in space, but extends across several crystal lattice periods. One quantum dot has a small amount of (1-100) electrons, holes or hole-electron pairs, that is, the quantity of electricity it carries is an integral multiple of element of electric-charges.

Quantum dot, also known as nanometer crystal, is a nanoparticle constituted of II-VI group or III-V group elements. The particle diameter of a quantum dot is generally between 1~10 nm. Since electrons and holes are quantumly confined, continuous energy band structure is transformed into discrete energy level structure with molecular characteristic, which can emit fluorescence after being stimulated. Based on the quantum effect, the quantum dots have wide application prospects in solar cells, illuminating devices, optical organism markers. Many different methods have been proposed to manufacture quantum dots, and quantum dot display products have been developed.

SUMMARY

One aspect of the present disclosure provides a quantum dot color filter for a liquid crystal panel, the liquid crystal panel comprising a plurality of pixels, each pixel comprising a plurality of sub-pixels, each sub-pixel corresponding to one color, wherein the color filter comprises subregions disposed in one to one correspondence with the sub-pixels, at least one of the subregions is formed of a quantum dot material and the quantum dot material generates light of the same color as a corresponding sub-pixel after excitation.

Another aspect of the present disclosure further provides a liquid crystal panel including the above-mentioned quantum dot color filter.

Still another aspect of the present disclosure provides a display device including a backlight source and the above-mentioned liquid crystal panel.

For example, the backlight source of the above-mentioned display device is a blue backlight source, subregions corresponding to red sub-pixels of the quantum dot color filter are formed of a red quantum dot material, subregions corresponding to green sub-pixels of the quantum dot color filter are formed of a green quantum dot material, and subregions corresponding to blue sub-pixels of the quantum dot color filter are transparent regions.

For example, a wavelength of light generated by the backlight source is less than that of light generated by the quantum dot material in the quantum dot color filter after excitation.

For example, the blue backlight source is a blue LED emitting light with a wavelength of 440 nm~455 nm.

For example, the red quantum dot material emits light with a wavelength of 520 nm~550 nm after excitation; and the green quantum dot material emits light with a wavelength of 620 nm~650 nm after excitation.

For example, the backlight source of the above-mentioned display device may also be a ultraviolet backlight source, subregions corresponding to red sub-pixels of the quantum dot color filter are formed of a red quantum dot material, subregions corresponding to green sub-pixels of the quantum dot color filter are formed of a green quantum dot material, and subregions corresponding to blue sub-pixels of the quantum dot color filter are formed of a blue quantum dot material.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein.

REFERENCE NUMERALS

1: Blue backlight; 2: RG color filter; 3: RGB light; 4: Array substrate; 5: Color filter substrate; 6: Bottom reflector; 7: Light source; 8: Light transmitting film; A: Liquid crystal panel; B: Backlight module.

DETAILED DESCRIPTION

Specific implementations of the present disclosure will be described further in detail below with reference to drawings and embodiments. The following embodiments are used to explain the present disclosure rather than limit the scope of the present disclosure.

It has been found in research that existing display products generally utilize white light emitting diode (LED) backlight sources in combination with ordinary color filters to provide color display, and this kind of color display has a low light source utilization rate and a narrow color gamut of display.

An embodiment of the present disclosure provides a quantum dot color filter that may be used for a liquid crystal panel. The liquid crystal panel has a plurality of pixels arranged in array. Each pixel has a plurality of sub-pixels each corresponding to one color to be displayed. The color filter includes subregions disposed in one-to-one correspondence to the sub-pixels of the liquid crystal panel. The at least one subregion is formed of a quantum dot material and the quantum dot material generates light with the same color as that of corresponding sub-pixel after being excited, and therefore a color filter formed of the quantum dot material can generate color light.

Because quantum dot materials needs different base materials, different particle diameters and materials of different properties, depending on their attributes, the quantum dot material of the present embodiment adopts a kernel-shell structure, such as dispersing the quantum dot material with specific optical properties in a resin base material. In order to obtain specific display effect, the composition of the quantum dot material, and the size of the quantum dot material can be modified to adjust illumination characteristic of quantum dots, such as wave crest and half peak width.

The quantum dots in the present embodiment may be of at least one of zinc sulfide, zinc oxide, gallium nitride, zinc selenide, cadmium sulfide, gallium selenide, cadmium selenide, zinc telluride, cadmium telluride, gallium arsenide, indium phosphide, lead telluride. Of course, the material for the quantum dot includes, but not limited to, the above-mentioned several ones, and other materials with same or similar properties with the above-mentioned substances may also be applicable. Taking zinc sulfide (ZnS) quantum dots as an example, the size of quantum dots emitting red light is mainly about 9~10 nm, the size of quantum dots emitting yellow light is mainly about 8 nm, and the size of quantum dots emitting green light is mainly about 7 nm.

Figure 1:
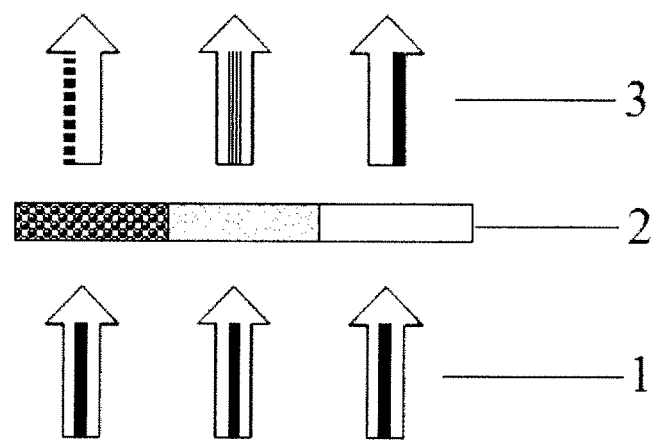
FIG. 1 is a principle diagram of light-filtering of a quantum dot color filter in an embodiment of the present disclosure.

FIG. 1 is a principle diagram of light-filtering of a quantum dot color filter in the present disclosure. As shown in FIG. 1, a blue backlight 1 is used as the light source, subregions on the color filter 2 include quantum dot material regions emitting red light after excitation by blue light, quantum dot material regions emitting green light after excitation by blue light, and transparent light filter regions without quantum dot material, thereby forming the color filter 2 with red and green (RG) quantum dots. After the blue light emitted by the blue backlight 1 transmits through the color filter 2, corresponding red, green and blue sub-pixel regions of the color filter 2 emit red, green and blue (RGB) light 3 respectively, realizing colorful transmission of the quantum dot color filter. The blue backlight 1 uses for example blue light LEDs as the light sources.

In another example, an ultraviolet source may also be used as the light source. Since light of a short wavelength has high energy, and only high energy state can excite low energy radiation, the wavelength of the backlight source should be less than the wavelengths of the light of corresponding colors after the quantum dot materials in the quantum dot layer are excited. Corresponding to the adopted ultraviolet source, subregions on the color filter include quantum dot material regions generating red light after excitation by ultraviolet light, quantum dot material regions generating green light after excitation by ultraviolet light, quantum dot material regions generating blue light after excitation by ultraviolet light, thereby forming a color filter with red, green, and blue (RGB) quantum dots. After the ultraviolet light emitted by the ultraviolet source passes the color filter, corresponding red, green and blue sub-pixel regions of the color filter emit red, green and blue (RGB) light respectively, realizing color transmission of the quantum dot color filter. This ultraviolet source uses, for example, ultraviolet LEDs as the light sources.

An embodiment of the present disclosure further provides a liquid crystal panel utilizing the above-described quantum dot color filter. In this liquid crystal panel, the array substrate and the color filter are disposed opposite to each other to form a liquid crystal cell in which liquid crystal material is filled. The pixel electrode of each pixel unit of the array substrate is configured to apply electric field to control rotation degree of the liquid crystal material, thereby implementing display operation.

Another embodiment of the present disclosure further provides a display device utilizing the above-mentioned liquid crystal panel and further including a backlight source (backlight module).

In addition to the above-mentioned RG quantum dot color filter, the display device of the present embodiment further includes a blue backlight source, and the subregions corresponding to red sub-pixels, on the RG quantum dot color filter, are formed of a red quantum dot material, the subregions corresponding to green sub-pixels are formed of a green quantum dot material, and the subregions corresponding to blue sub-pixels are transparent regions that can let the blue light from the light source pass by substantially without blocking. Since the display effect of the quantum dot display panel depends on the quantum dot material used in the quantum dot color filter and the backlight source of blue LEDs, and the wave crest, the half peak width and the wave amplitude of the blue LEDs can be adjusted accordingly depending on the selection of quantum dot materials.

In the present embodiment, blue LEDs of wavelength of 440 nm~455 nm are selected for the blue backlight source. The shorter the wavelength, the higher the efficiency. Generally, blue LED chips which can be mass produced at present stage emit light with a half peak width of 20 nm. Blue LED chips with a narrower half peak width can be correspondingly selected to precisely adjust and control the wave crest position through adjustment upon the quantum dot material and its size. The wavelength of a green quantum dot material after excitation may be G: 520~550 nm, and similarly the wavelength of a red quantum dot material after excitation may be R: 620~650 nm. The narrower the half peak width, the higher the color purity. As narrow as possible half peak width is selected, preferably less than 50 nm, which can increase the color gamut.

Figure 2:
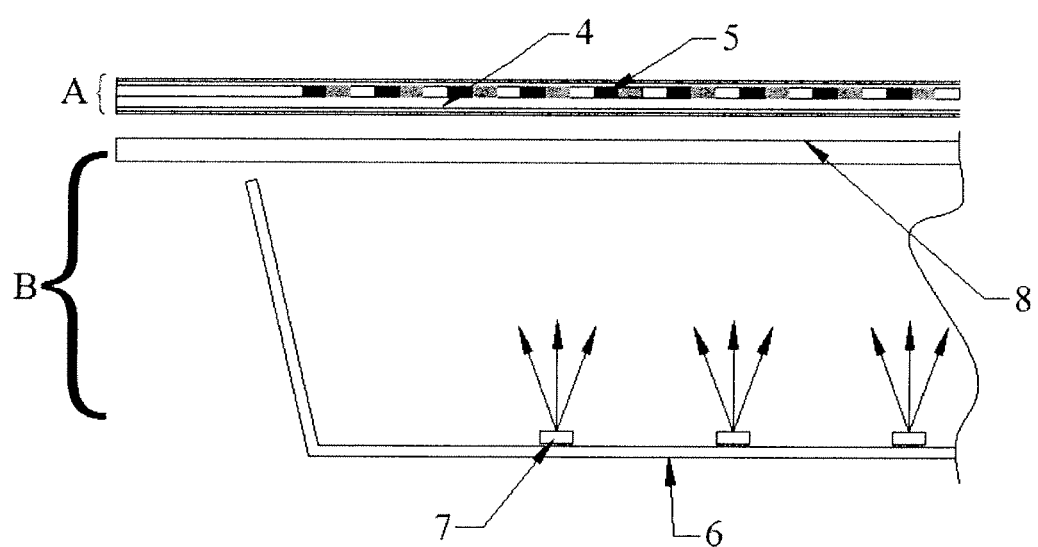
FIG. 2 is a structural representation of a display device in an embodiment of the present disclosure.

FIG. 2 is a structural representation of a display device according to an embodiment of the present disclosure. As shown in FIG. 2, the display device mainly includes a liquid crystal panel A and a backlight module B. The liquid crystal panel A includes an array substrate 4, a color filter substrate 5, and a liquid crystal layer sandwiched between the two substrates. For example, the backlight module B includes a bottom reflector 6, light sources 7 disposed on the bottom reflector 6, and a light transmitting film 8 for light transmission and disposed adjacent to the liquid crystal panel A. The light source 7 is for example a blue backlight source, and the color filter substrate 5 includes the above-mentioned RG quantum dot color filter. When the blue light from the light sources 7 passes through the red regions of the color filter, it excites the red quantum dot material to generate red light, and therefore light generated through the red filter is all red light. When the blue light passes through the green regions of the color filter, it excites the green quantum dot material to generate green light, and therefore light generated through the green filter is all green light. While after the blue light passes through the transparent regions of the color filter, it passes directly and is all blue light. Since the blue backlight intensity has no loss in the process, light source utilization rate is greatly improved. For the same light intensity in display, power consumption of LED light source can reduced compared with a conventional liquid crystal panel, thereby realizing wide color gamut and low power consumption display of the liquid crystal panel.

Another embodiment of the present disclosure further provides a display device with a specific structure similar to that of the display device of the above described embodiment except that an ultraviolet backlight source is used to replace the blue backlight source. Accordingly, the subregions corresponding to the red sub-pixels on the color filter are formed of a red quantum dot material, the subregions corresponding to the green sub-pixels are formed of a green quantum dot material, the subregions corresponding to the blue sub-pixels are formed of a blue quantum dot material, the quantum dot color filter including red filter, green filter and blue filter thus formed can generate red, green and blue light upon ultraviolet illumination.

It should be noted that the liquid crystal panel according to embodiments of the present disclosure is not limited to RGB mode, and may also be the printing color mode (CMYK, cyan, magenta, yellow and black) or other defined mode, and different quantum dot materials are disposed on different color regions of the quantum dot color filter.

The display device in embodiments of the present disclosure may be products or components with any display function including, but not limited to, electronic paper, organic light emitting diode (OLED) panel, liquid crystal TV, liquid crystal monitor, digital picture frame, mobile telephone, flat computer.

The embodiments of the present disclosure can improve the utilization rate of a backlight source and obtain color light of high purity by forming the color filter with quantum dot materials in which red, green or blue filter use quantum dot materials that respectively generate red, green or blue light after light excitation, and therefore the quantum dot display may realize color display of a wide color gamut and low power consumption.

The embodiment of the disclosure being thus described, it will be obvious that the same may be varied in many ways. Such variations are not to be regarded as a departure from the spirit and scope of the disclosure, and all such modifications as would be obvious to those skilled in the art are intended to be included within the scope of the following claims.

What is claimed is:

1. A display device comprising a backlight source and a liquid crystal panel,
   the liquid crystal panel comprising a quantum dot color filter,
   the liquid crystal panel comprising a plurality of pixels, each pixel comprising a plurality of sub-pixels, each sub-pixel corresponding to one color, wherein the color filter comprises subregions disposed in one to one correspondence with the sub-pixels, at least one of the subregions is formed of a quantum dot material and the quantum dot material generates light of the same color as a corresponding sub-pixel after excitation, wherein subregions corresponding to red sub-pixels of the quantum dot color filter are formed of a red quantum dot material, subregions corresponding to green sub-pixels of the quantum dot color filter are formed of a green quantum dot material, and the green quantum dot material only emits light with a wavelength of 520 nm~550 nm and a half peak width less than 50 nm after excitation; and the red quantum dot material only emits light with a wavelength of 620 nm~650 nm and a half peak width less than 50 nm after excitation,
   wherein the backlight source is a blue backlight source, and subregions corresponding to the blue sub-pixels of the quantum dot color filter are transparent regions,
   wherein the blue backlight source is a blue light emitting diode (LED) emitting light with a wavelength of 440 nm~455 nm and a half peak width less than 20 nm.

\* \* \* \* \*